Jan. 12, 1932.     C. R. LOTT     1,840,458
MAKING GLASSWARE
Original Filed Sept. 27, 1909    3 Sheets-Sheet 1
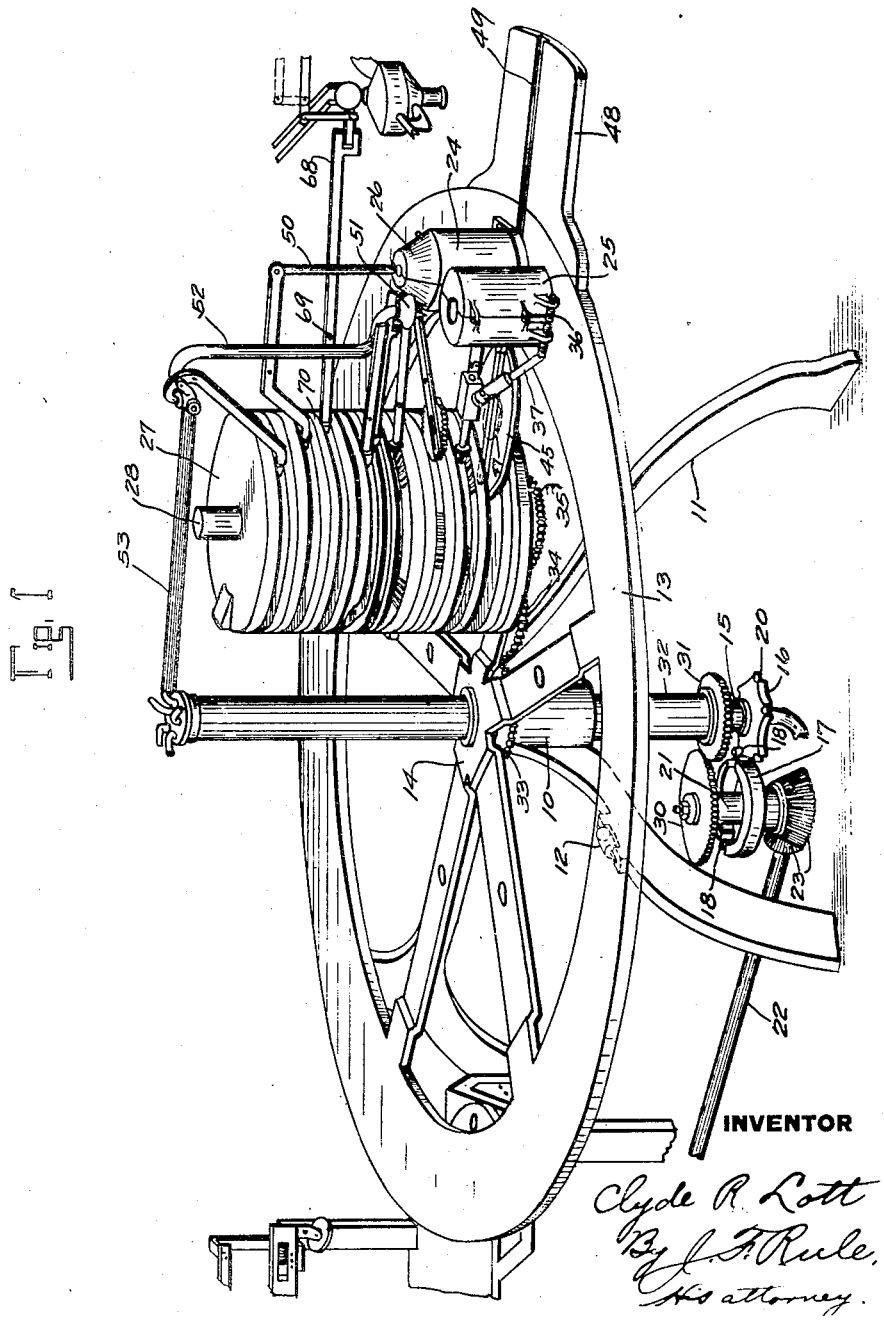
INVENTOR
Clyde R. Lott
By J. F. Rule,
His attorney.

Jan. 12, 1932.  C. R. LOTT  1,840,458
MAKING GLASSWARE
Original Filed Sept. 27, 1909  3 Sheets-Sheet 2
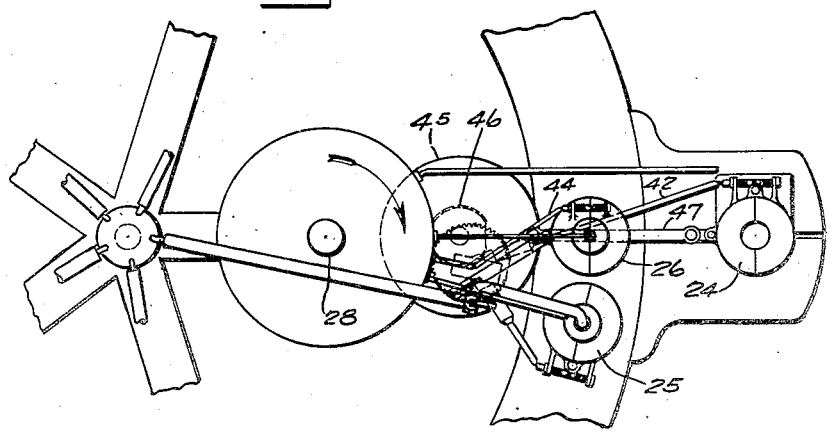
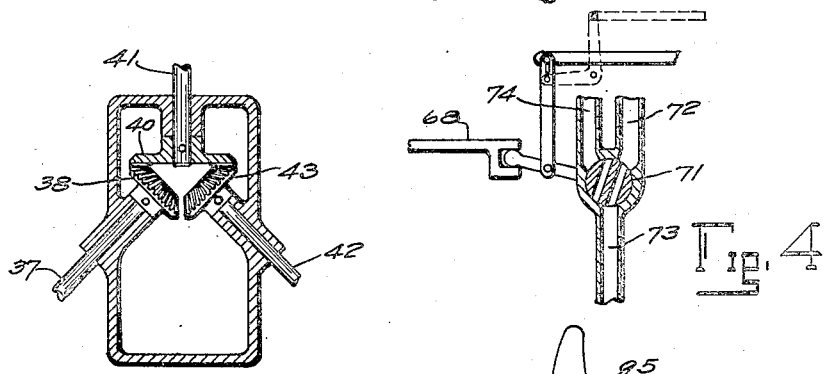
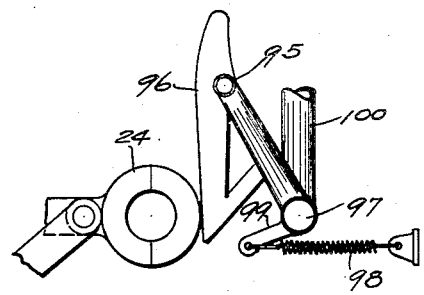
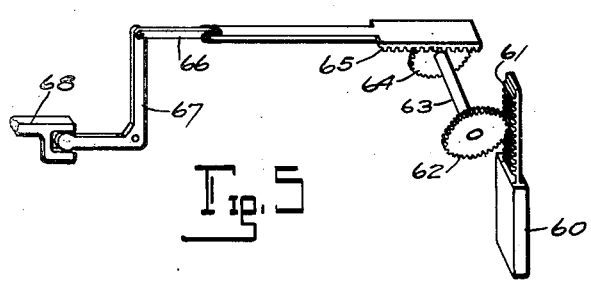
INVENTOR
Clyde R. Lott,
By J. F. Rule.
His attorney Jan. 12, 1932. C. R. LOTT 1,840,458
MAKING GLASSWARE
Original Filed Sept. 27, 1909  3 Sheets-Sheet 3
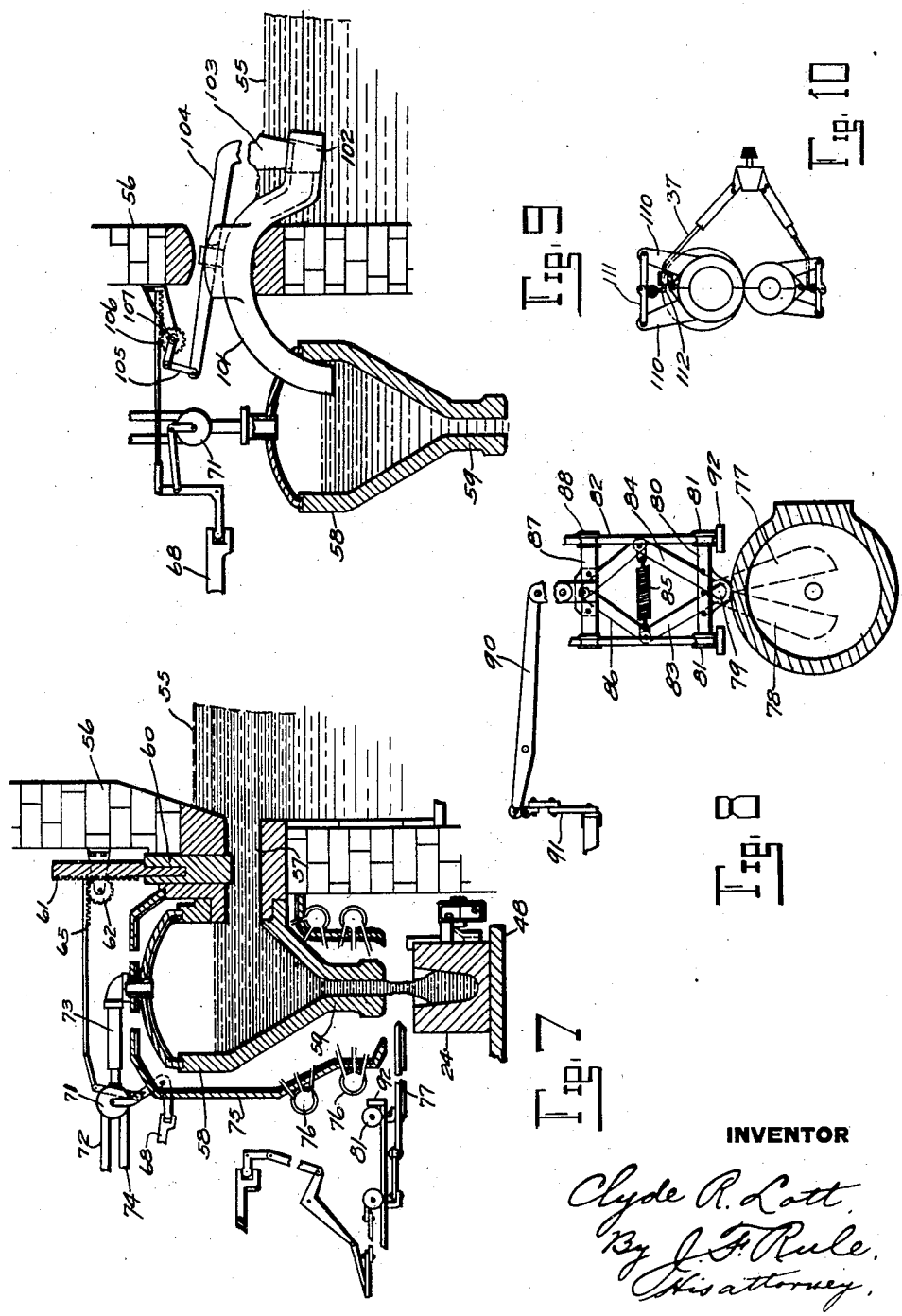
INVENTOR
Clyde R. Lott,
By J. F. Rule,
His attorney.

UNITED STATES PATENT OFFICE

CLYDE R. LOTT, OF WASHINGTON, DISTRICT OF COLUMBIA, ASSIGNOR, BY MESNE ASSIGNMENTS, TO THE OWENS BOTTLE COMPANY, A CORPORATION OF OHIO

MAKING GLASSWARE

Original application filed September 27, 1909, Serial No. 519,678. Divided and this application filed July 13, 1918. Serial No. 244,684. Renewed December 13, 1928.

My invention relates to making glassware by the method which consists in discharging the glass from an outlet in a furnace or receptacle containing molten glass, and intermittently severing the discharging glass by a mechanical shear or cutter, thereby segregating individual masses or gobs which are introduced into molds of a glass forming machine.

An object of my invention is to provide improved means for reheating the cut surface of the glass remaining after each gob has been severed, thereby eliminating the shear marks and putting the glass in the best condition for being formed in the mold. The glass as it is discharged from the furnace boot or supply chamber is in a semi-liquid or plastic condition and at a very high temperature. The contact of the metal cutter or shears, which must be kept at a comparatively low temperature to prevent sticking to the glass, chills the surface of the glass. If the glass is placed in the mold in this condition the chilled surface does not readily take the form of the mold. The chilling of the glass also changes its density, refractive power and homogeneity, so that there results a scar or defect in the finished ware. In the present invention this defect is overcome by providing a burner which is brought beneath the cut surface of glass after each cutting operation and directs a flame upwardly against said surface, thereby re-melting the chilled surface and eliminating the scar.

A further object of the invention relates to improved means for controlling the flow of glass. For this purpose means are provided for periodically varying the pressure within the refining chamber or receptacle from which the glass is discharged, and thereby causing an intermittent or fluctuating flow of glass. A valve, or means operated in synchronism with the pressure varying means, is provided to control the passage between the melting tank and refining furnace.

Another feature of the invention relates to the form of the refining chamber which is provided with a downwardly extended neck or spout through which the glass is discharged, in combination with means to locally apply heat to said spout and to the glass issuing from the spout, whereby the glass is brought to and maintained at a suitable temperature for entering the molds, and chilling of the glass and clogging of the flow opening is prevented.

Other features of the invention will appear hereinafter.

The present application is a division of my co-pending application for apparatus for making glass, Serial Number 519,678, filed September 27, 1909.

In the accompanying drawings: Figure 1 is a perspective view showing a portion of a glass forming machine which may be used in connection with my invention.

Figure 2 is a fragmentary plan view of the same.

Figure 3 is a sectional plan of gearing for operating the mold sections.

Figure 4 is a sectional view of a valve controlling the pressure within the supply chamber.

Fig. 5 shows means for operating a gate valve.

Figure 6 is a plan view of the burner for re-heating the glass after it is cut.

Figure 7 is a sectional elevation showing a furnace, a mold and cutting apparatus.

Figure 8 is a plan view of the cutting apparatus.

Figure 9 shows a modification of the construction shown in Figure 7.

Figure 10 shows a modified construction for operating the molds.

The molds which receive the charges of glass are brought successively beneath the glass discharging opening of the furnace. The molds, as shown, are carried on and form part of a glass shaping machine on which the glass is pressed and blown in the molds to form bottles or other ware. Any suitable or approved type of glass forming machine, or apparatus for bringing the molds successively to charging position, may be employed.

Referring to Figs. 1 and 2, the machine as shown comprises a stationary hub 10 having legs 11 extending outwardly therefrom, the legs being provided with anti-friction rollers 12 on which an intermittently rotating mold table 13 is supported. The mold table is provided with a hub 14 fixed to a shaft 15 whose lower end is provided with a star wheel 16 driven by a disc 17 having diametrically opposite pins 18 which alternately engage notches 20 in the star wheel. The disc 17 is rotated continuously, being mounted on a stud shaft 21 rotated by a drive shaft 22 connected through mitre gears 23 with the stud shaft. By means of the gearing just described an intermittent or step-by-step rotation is imparted to the mold table which is moved forward one step each time a pin 18 engages a notch 20 in the star wheel. As the mold table completes each forward movement it is locked in position by the interlocking of the star wheel and disc 17.

The molds are arranged in pairs or sets on the mold table 13, each set comprising a blank mold 24, a blow mold 25 and an auxiliary or neck mold 26 adapted to register alternately with the blank mold and blow mold, as hereinafter described. I have herein shown only one set of molds on the mold table. It will be understood, however, that the machine is designed and intended to include a number of sets mounted on and equally spaced around the table, all the sets and their operating mechanisms being alike.

Associated with each set of molds is what I term for convenience a cam or controller 27. This controller comprises a series of cam discs or plates fixed to a shaft 28 by which the controller is given one complete rotation about its axis during each complete revolution of the mold table. The cam discs control the various movements of the molds and other parts as hereinafter pointed out. The means herein shown for rotating the controller comprises a gear wheel 30 on the stud shaft 21 meshing with a pinion 31 on a sleeve 32 journalled in the hub 10 and having fixed thereto a gear 33. The gear 33 drives a pinion 34 which in turn drives a gear 35 secured to the shaft 28.

The blow mold 25, as shown, comprises a pair of hinged sections which may be opened and closed by means of right and left hand screws 36 connected by a universal joint to a rod 37 having telescoping sections and connected through a universal joint and gears 38, 40 to a shaft 41 driven by one of the controller discs. The sections of the blank mold 24 may be opened and closed in like manner through connections comprising a shaft 42 (Fig. 3) and gears 43, 40. The neck mold sections 26 may also be formed in sections actuated by suitable connections 44 on one of the cam discs.

Each step rotation of the mold table brings one of the blank molds 24 opposite the charging station. The blank mold is then moved radially outward to receive its charge of glass. The means for moving the mold radially comprises a disc 45 which is connected with a mutilated gear 46 driven at suitable intervals by gear teeth on one of the controller discs. A link 47 is connected at one end to the disc 45 and has a connection at its opposite end with the mold 24, so that the rotation of the disc 45 moves the blank mold radially outward to charging position, and after it has received its charge, returns it to the mold table. The mold is supported on a stationary platform 48 while projected beyond the mold table, the platform being provided with a groove 49 to register with grooves in the mold table. The molds are provided with suitable guiding lugs to move in said grooves.

After a blank mold has received its charge it is returned to its normal position on the mold table. The neck mold 26 is now in register with the blank mold. A plunger 50 actuated by one of the cam discs moves downward into the mold, thereby forming a blow opening and also shaping the glass in the neck mold. The blank mold and blow mold now open leaving the blank suspended from the neck mold. The latter is then swung horizontally to carry the blank into the blow mold, which closes on the blank. The blowing head 51 is now positioned over the neck mold and air under pressure is supplied through pipes 52, 53 to blow the blank into its finished form. It will be understood that the mechanism including the cam discs is arranged and timed to effect the several operations in the proper sequence and at the proper time. The blow mold is opened to permit the removal of the finished article a suitable time after the mold has left the charging station. The form of molds and mechanism for actuating the same may be widely varied.

Referring to Fig. 7, the molten glass 55 is supplied from a continuous melting furnace 56. The glass flows from the melting tank through a passageway 57 into a supply chamber 58. The latter is formed with a neck or spout 59 providing a restricted passageway through which the molten glass flows or is discharged downwardly into the mold 24 therebeneath. The flow of glass from the chamber 58 may be controlled by intermittently varying the air pressure within the chamber. A gate valve 60 may be used to close the outlet 57 and permit such pressure control. The gate is actuated by a rack 61 connected thereto and driven by a pinion 62 on a shaft 63 (Fig. 5) to which is also connected a pinion 64 driven by a rack 65. The latter is connected through a link 66 and bell crank lever 67 to an actuating lever 68 fulcrumed at 69 and actuated by a cam disc 70.

The air pressure in the chamber 58 is controlled by a three-way valve 71 (see Fig. 4). When the valve is in the position shown in Fig. 4, air pressure is admitted from a pipe 72 through the valve and a pipe 73 to the chamber 58, thereby assisting gravity to force the glass through the spout 59. When the valve is reversed the air is exhausted through a pipe 74, thereby retarding or stopping the downward movement of glass through the discharge spout. The valve is controlled from one of the cam discs and as shown, may be actuated by the same lever 68 as the gate valve 60.

The supply chamber 58 is enclosed or surrounded by a heating chamber or casing 75, which may be heated by pipes 76. It will be noted that these pipes are arranged to direct the heating flames against the neck or spout 59. The arrangement of the pipes and the casing 75 with its lower walls inclined downwardly is such that the flames are caused to envelop the spout 59 and the glass directly beneath the spout as it issues therefrom, whereby the glass issuing from the supply chamber is heated to a sufficient degree, so that the glass is in the best condition for entering the mold and being shaped therein.

The cutting mecahnism comprises a pair of shear blades 77 and 78 pivoted at 79 to a transverse bar or axle 80 having wheels 81 which run on tracks 82. The blade 78 has a shank 83 and the blade 77 a shank 84 extending back from the pivot 79. A spring 85 connecting said shanks normally holds the blades separated. Links 86 connect said shanks to a bar 87 having wheels 88 running on the rails 82. The shears may be actuated by means of a lever 90 connected to the axle 87 and having connections 91 with a lever operated from one of the cam discs. The shears are normally withdrawn bodily to a position beyond the heating chamber. When the lever 90 is actuated to bring the shears into operation the latter are first moved forward with the carriage, comprising the bars 80 and 87, until the front wheels 81 strike stops 92. The continued movement of the lever 90 causes the rear axle 87 to approach the front axle so that the links 86 spread the shanks 83, 84 and cause a cutting stroke of the shear blades. These movements are then reversed to separate the shear blades and withdraw the shears from beneath the spout.

The gate valve 60, the three-way valve 71 and the shears are all operated in suitable timed relation to effect their functions in their proper order. That is to say, the gate valve is closed while pressure is applied through the three-way valve, thereby preventing the glass from being forced back into the furnace and permitting suitable pressure to be maintained for discharging the glass at the spout 59. After such pressure has been maintained a sufficient length of time the three-way valve is reversed, thereby reducing the pressure in the supply chamber below atmospheric pressure. This causes a reduction in the flow and causes the stream or column of glass at the cut-off point to be restricted. The shears then operate to sever the charge in the mold from the supply. The mold is then withdrawn and replaced by a succeeding mold.

Figure 6 shows a means for re-heating the cut end of the stream or column of glass after the knife operates. This means comprises a jointed burner 95 which throws a blaze upward against the cut end of the glass during the time the mold 24 is removed from its charging position beneath the spout. When the mold is extended to the position shown in Figs. 6 and 7 to receive a charge, it strikes a finder 96 attached to the burner which is jointed at 97 and moves the burner away from the spout. As soon as the mold is moved away from the spout the burner is swung to its operative position by a spring 98. The spring is connected to a support at one end and is attached at its other end to an arm 99 rigidly connected with the burner. Fuel is supplied to the burner by a pipe 100. The construction just described provides means whereby a flame is directed against the cut end of the glass after the gob is severed, thereby reheating the surface which has been chilled by contact with the comparatively cold cutter. The knife scar which would otherwise appear in the finished ware is thus entirely eliminated and the glass placed in the best condition for being formed in the mold. It will be understood, of course, that the shears are withdrawn after each cut so as not to interfere with the flame being thrown directly against the end of the cut surface of the glass.

Figure 9 shows a modification in which the glass is transferred from the tank to the supply chamber 58 through a curved pipe or siphon 101. The tank opening 102 in this pipe is normally closed by a plug 103 on one end of a lever 104 whose other end is connected through a link 105 to a crank on a pinion 106 driven by a rack 107. This rack is driven by any suitable connection from one of the cam discs and may be conveniently connected, as here shown, to be operated by the lever 68 which also operates the valve 71. The principle of operation is substantially the same for this construction as that shown in Fig. 7.

Figure 10 shows a modified construction for opening and closing the molds. As here shown, each pair of mold sections is provided with lugs 110 actuated by a toggle 111. The telescoping shafts 37 are connected by universal joints with rock shafts 112, each having a rock arm connected with a toggle 111. When the rock shafts are rocked to move the rock arms inward the molds are opened and when rocked to the position shown, the toggles are straightened and the molds locked in closed position.

Various modifications may be resorted to without departing from the spirit and scope of my invention.

What I claim is:

1. The method of manipulating molten glass which comprises, the downward discharge of glass from a source of supply, the periodic cutting off of discharged portions of glass from the supply by a mechanical shear, the directing of a local flame upwardly against the freshly produced end after each cut and thereby locally reheating the cut glass, and the presentation of successive receptacles to receive the charges of glass.

2. The method which consists in causing a downward discharge of molten glass in the form of a stream or column from a supply of molten glass, periodically severing gobs or masses of glass from said stream or column, withdrawing the severing means and directing a flame against the severed end of the stream to re-heat it, and discontinuing said re-heating operation prior to the succeeding severing operation.

3. That improvement in the art of glass-working which comprises the delivery of a downwardly flowing suspended stream of glass, the successive cutting of end portions from said stream at a point spaced below the suspension plane by a mechanical shearing member, the withdrawal of said shearing member from the stream, and the subsequent application to the freshly cut end of said stream of an upwardly moving stream of gas in a state of combustion.

4. That improvement in the art of glass-working which comprises the delivery of a downwardly flowing stream of glass, the successive cutting of end portions from said stream by a mechanical shearing member, the withdrawal of said shearing member from the stream, and the subsequent application to the freshly cut end of said stream of an upwardly moving stream of gas in a state of combustion.

5. The method which consists in flowing a stream of molten glass, severing a charge of glass therefrom, and then reheating the freshly cut end of the stream by direct application af gaseous heat directed upwardly against said cut end.

6. The combination of a furnace to contain molten glass, a receptacle in communication with the furnace, a valve arranged to control the flow of molten glass from the furnace to the receptacle, valve controlled means to vary the air pressure within the receptacle and thereby control the discharge of glass from the receptacle, interconnected means to periodically actuate said valves, and a cutter operated in synchronism with the operation of the valves for severing charges of glass discharged from said receptacle.

7. The method which comprises the downward discharge of a stream of molten glass from a supply body, the successive severing of said stream to segregate individual masses from the supply body, and the subsequent application to the severed end of the stream of a stream of gas moving in a direction in opposition to that of the glass stream.

8. The method which comprises the downward discharge of a stream of molten glass from a supply body, the successive severing of said stream to segregate individual masses from the supply body, and the subsequent application to the severed end of the stream of an upwardly directed stream of burning gas.

9. That improvement in the art of handling glass which comprises the downward delivery of a stream of glass from a source of supply, the cutting of the lower end of said stream from the supply, and the application to the new lower end, of an upwardly directed stream of gas.

10. That improvement in the art of glass working which comprises, the delivery of a downwardly flowing stream of glass from a source of supply, the successive separation of said stream into portions, and the successive application to the successive lower ends of the stream of an upwardly flowing gas acting upon said successive lower ends for intervals immediately succeeding the act of separation.

11. That improvement in the art of glass working which comprises, the delivery of a downwardly flowing suspended stream of glass from a source of supply, the successive mechanical cutting of said stream, the withdrawal of the mechanical cutting means from the freshly produced lower end of the stream, and the successive temporary application to the freshly produced lower ends of an upwardly moving gas subsequent to the withdrawal of the cutting means.

12. That improvement in the art of glass working which comprises the delivery of a downwardly flowing suspended stream of glass, the successive cutting of end portions from said stream at a point spaced below the suspension plane by a mechanical shearing member, the withdrawal of said shearing member from the stream, and the subsequent application to the freshly cut end of said stream of an upwardly moving stream of gas.

13. That improvement in the art of glass working which comprises the delivery of a downwardly flowing stream of glass, the successive cutting of end portions from said stream by a mechanical shearing member, the withdrawal of said shearing member from the stream, and the subsequent application to the freshly cut end of said stream of an upwardly moving stream of gas.

14. That improvement in the art of glass working which comprises the delivery of a downwardly moving stream of glass from a source of supply, the successive presentation of receptacles in the line of flow of said stream to receive the same, the successive separation of ends from said stream and the temporary application to the freshly produced ends of said stream, in the interval of shifting the receptacles from and to receiving position, of an upwardly moving gas stream in a state of combustion, and the withdrawal of said gaseous stream out of the path of the glass stream.

15. That improvement in the art of glass working which comprises the temporary application directly beneath a downwardly flowing stream of glass from a source of supply, of an upwardly moving stream of gas in a state of combustion.

16. The combination with a tank to contain molten glass, of a receptacle into which the glass flows from said tank, a valve controlling the passage through which the glass flows to said receptacle, the latter having a discharge opening below the level of the glass, means for periodically severing gobs or charges of glass at a point beneath said discharge opening, and means to periodically reduce the air pressure in said receptacle below atmospheric pressure.

17. The combination of a receptacle for molten glass having a discharge outlet below the level of the glass therein, means for periodically applying super-atmospheric pressure to the glass over the outlet and thereby exerting an expelling force on the glass issuing through said outlet, means operating in synchronism with said pressure applications to periodically sever the glass beneath the outlet, and means operating periodically and in alternation with said applications of super atmospheric pressure to reduce the pressure above the glass below atmospheric pressure and maintain said reduced pressure during predetermined time intervals, thereby causing discontinuance of the flow of glass at the outlet and maintaining said discontinuance for a predetermined time interval after each severance.

18. The combination with a tank to contain molten glass, of a receptacle into which the glass flows from said tank, said receptacle having a discharge outlet below the level of the glass, a valve controlling the passage through which the gass flows to said outlet, means for periodically severing gobs or charges of glass at a point beneath said discharge outlet, and means to periodically reduce the air pressure in said receptacle below atmospheric pressure.

Signed at Toledo, in the county of Lucas and State of Ohio, this 10th day of July, 1918.

CLYDE R. LOTT.